United States Patent [19]

Schlegel et al.

[11] 4,094,143

[45] June 13, 1978

[54] VARIABLE TORQUE HYDRAULIC CLUTCH

[75] Inventors: William R. Schlegel; Harry E. Mayhew, Jr., both of Wilmington, Del.

[73] Assignee: All American Industries, Inc., Thomaston, Conn.

[21] Appl. No.: 750,264

[22] Filed: Dec. 13, 1976

[51] Int. Cl.² ............................................. F16D 33/02
[52] U.S. Cl. ....................................... 60/352; 60/353; 74/572; 244/63
[58] Field of Search .......................... 60/352, 353, 413; 74/572; 244/63

[56] References Cited

U.S. PATENT DOCUMENTS

| Re. 28,736 | 3/1976 | Myhr et al. | 60/353 X |
| 1,199,361 | 9/1916 | Föttinger | 60/353 |
| 2,096,071 | 10/1937 | Sinclair | 60/352 |
| 2,586,136 | 2/1952 | Wyndham | 60/352 |
| 3,572,480 | 3/1971 | Nagel | 60/353 X |

*Primary Examiner*—Edgar W. Geoghegan
*Attorney, Agent, or Firm*—Connolly and Hutz

[57] ABSTRACT

The hydraulic energy absorbing device of U.S. Pat. Re. 28,736 is adapted to serve as a variable torque hydraulic clutch for a flywheel catapult by mobilizing the fixed array of annular vanes disposed about the rotor blades and mounting them on an output shaft. The torque transmission through the device is controlled by the degree of enclosure of the input rotor blade ring by a channel-shaped shroud, which is mounted in an annular recess in the toroidal flow-control ring disposed in an annular cavity in the casing.

9 Claims, 6 Drawing Figures

Fig. 6. Output Torque vs Input RPM For Various Shroud Settings

VARIABLE TORQUE HYDRAULIC CLUTCH

BACKGROUND OF THE INVENTION

A flywheel catapult for launching aircraft requires a clutch for maintaining the prime mover and flywheel disconnected from the catapult shuttle until they are completely up to speed and full power output when the clutch is suddenly engaged to drive the shuttle through its launching stroke. Various types of clutches have been proposed for such service, for example, those described in U.S. Pat. Nos. 2,672,306 and 3,305,195. Such clutches are, however, not simple, economical, dependable, rugged, and durable. An object of this invention is to provide a relatively simple, economical, dependable, rugged and durable variable torque hydraulic clutch for a flywheel catapult.

SUMMARY

In accordance with this invention an output rotor blade ring is disposed peripherally adjacent the input rotor blade ring of a torque convertor having a flow-control ring disposed laterally adjacent to the rotor blade rings. A movable shroud is stored in an annular recess in the flow-control ring while full torque is transmitted through the clutch. The amount of transmitted torque is reduced to practically nothing by moving the shroud out of the recess and over the input blade ring to prevent the liquid in the casing from circulating through it in part or entirely. The degree of coverage of the input rotor blades by the shroud determines the amount of torque transmitted through the clutch.

BRIEF DESCRIPTION OF THE DRAWINGS

Novel features and advantages of the present invention will become apparent to one skilled in the art from a reading of the following description in conjunction with the accompanying drawing wherein similar reference characters refer to similar parts and in which.

DESCRIPTION OF THE PREFERRED EMBODIMENT

Figures 1, 2:
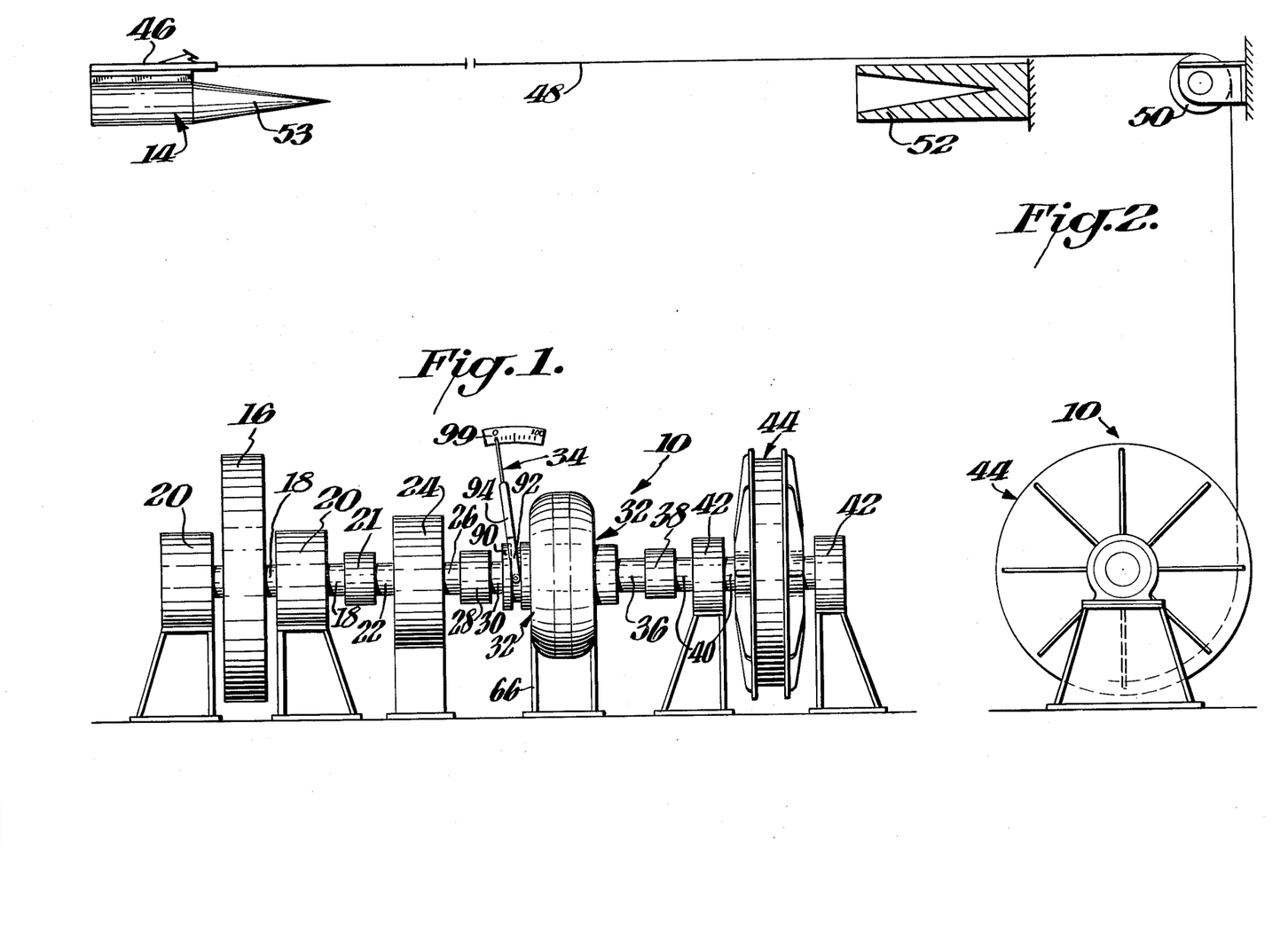
FIG. 1 is a front view in elevation of one embodiment of this invention.
FIG. 2 is a schematic end view in elevation of the embodiment shown in FIG. 1.

In FIGS. 1 and 2 is shown a flywheel catapult installation 10 for propelling a catapult shuttle 14, which is schematically represented. Flywheel catapult installation 10 includes a prime mover (not shown), a fly wheel 16 rotatably mounted on shaft 18 between a pair of bearings 20, which are for example of the hydrostatic type. Input shaft 18 is connected by coupling 21 to intermediate input gear shaft 22 which drives gear box 24. Output gear shaft 26 from gearbox 24 is connected by coupling 28 to input shaft 30 of variable torque hydraulic clutch 32. The degree of torque transmitted through clutch 32 is varied by control linkage 34. Output shaft 36 from clutch 32 is connected by coupling 38 with further output shaft 40. Output shaft 40 is rotatably mounted between pillow block bearings 42 for rotating tape reel 44.

FIG. 2 schematically shows tape reel 44 connected to drive catapult shuttle 14 through flat nylon tape 48 disposed over idler pulley 50. The motion of shuttle 14 is arrested by brake 52, which is constructed and arranged for stopping the travel of shuttle arrester 53, for example in the manner shown in U.S. Pat. No. 2,514,406.

Figure 3:
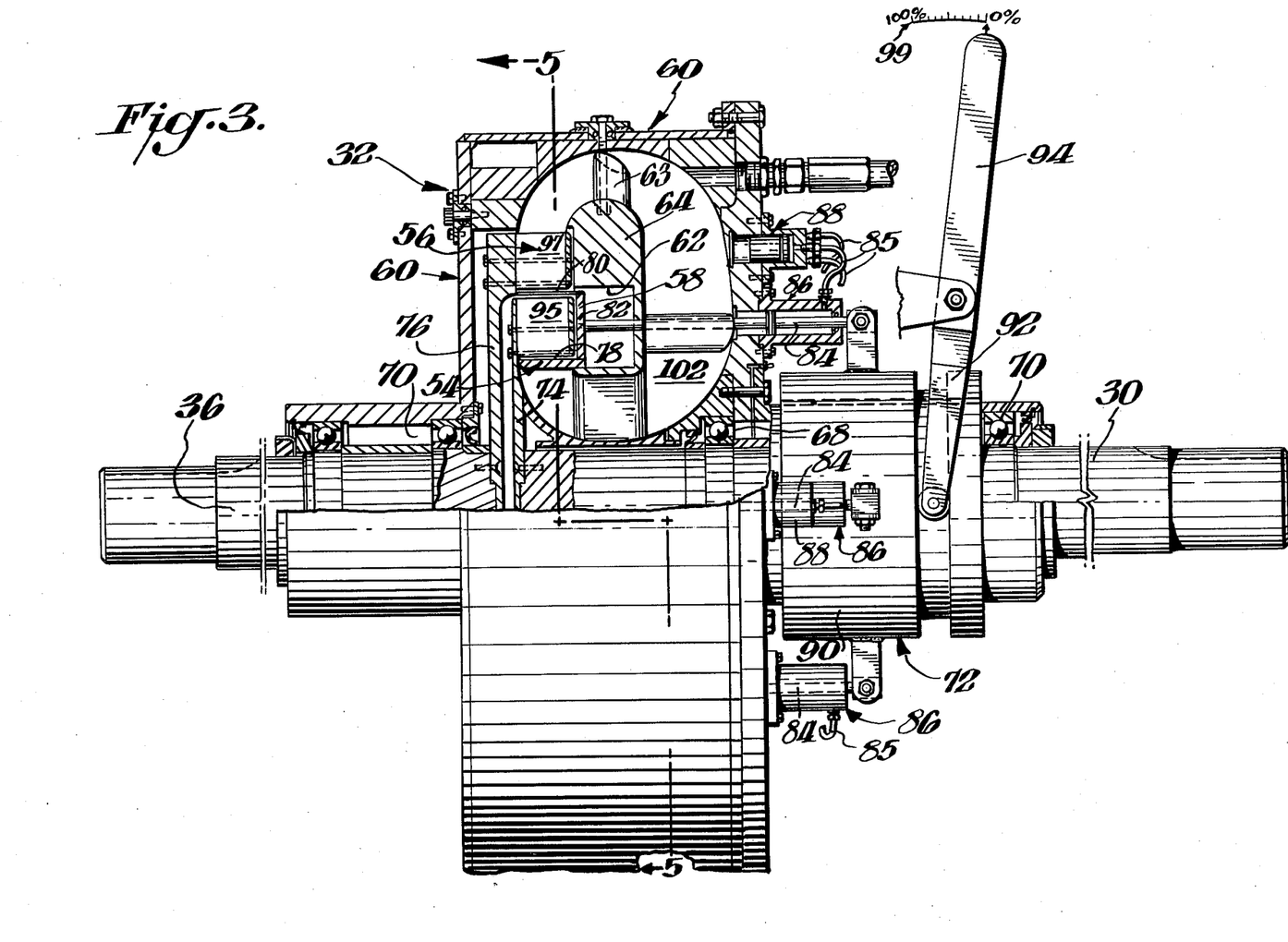
FIG. 3 is a side view in elevation partially broken away in cross section of the variable hydraulic clutch shown in FIG. 1 in the disengaged condition.
Figure 4:
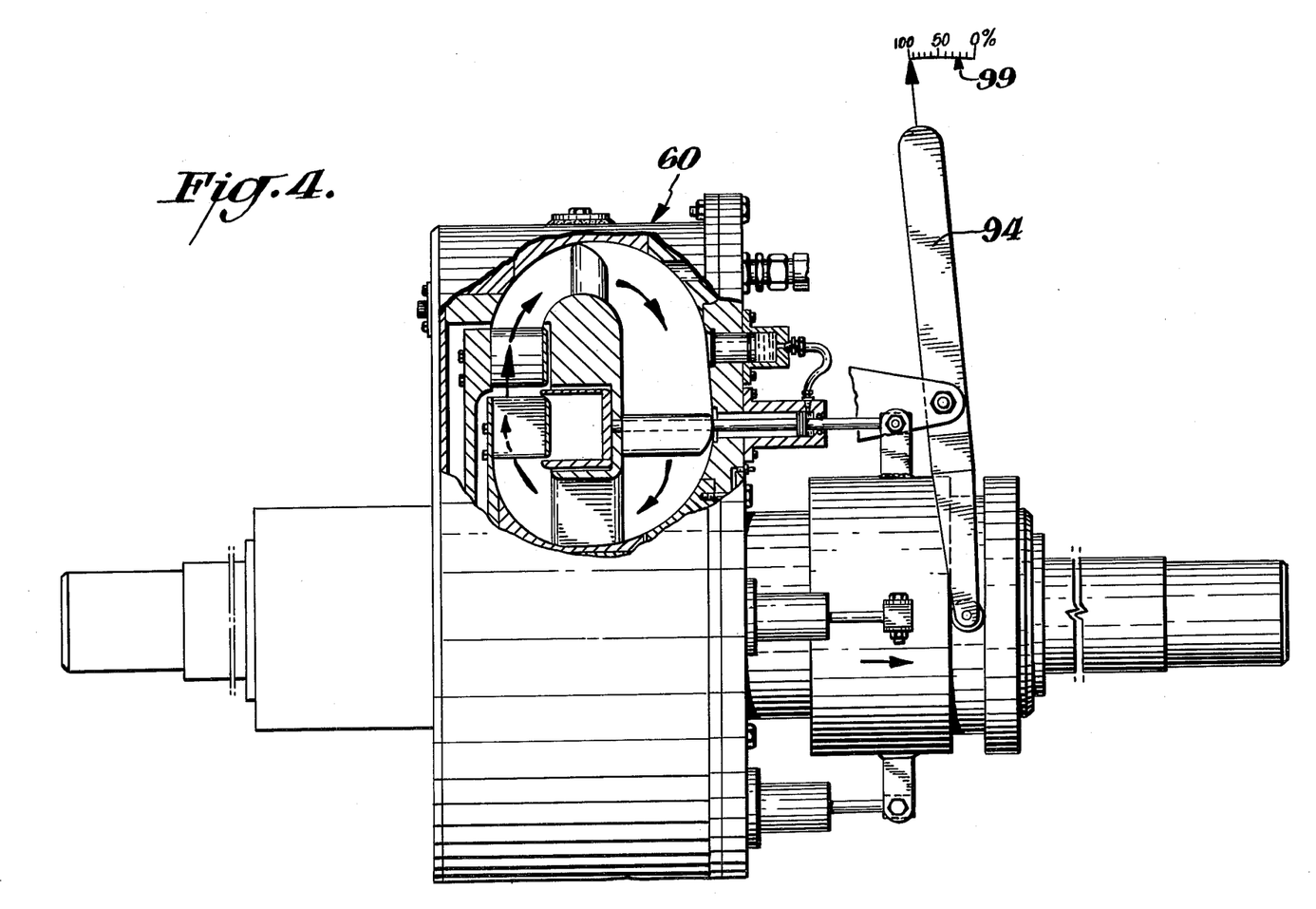
FIG. 4 is a side view in elevation partially broken away in cross section of the variable hydraulic clutch shown in FIG. 1 in the engaged condition.
Figure 5:
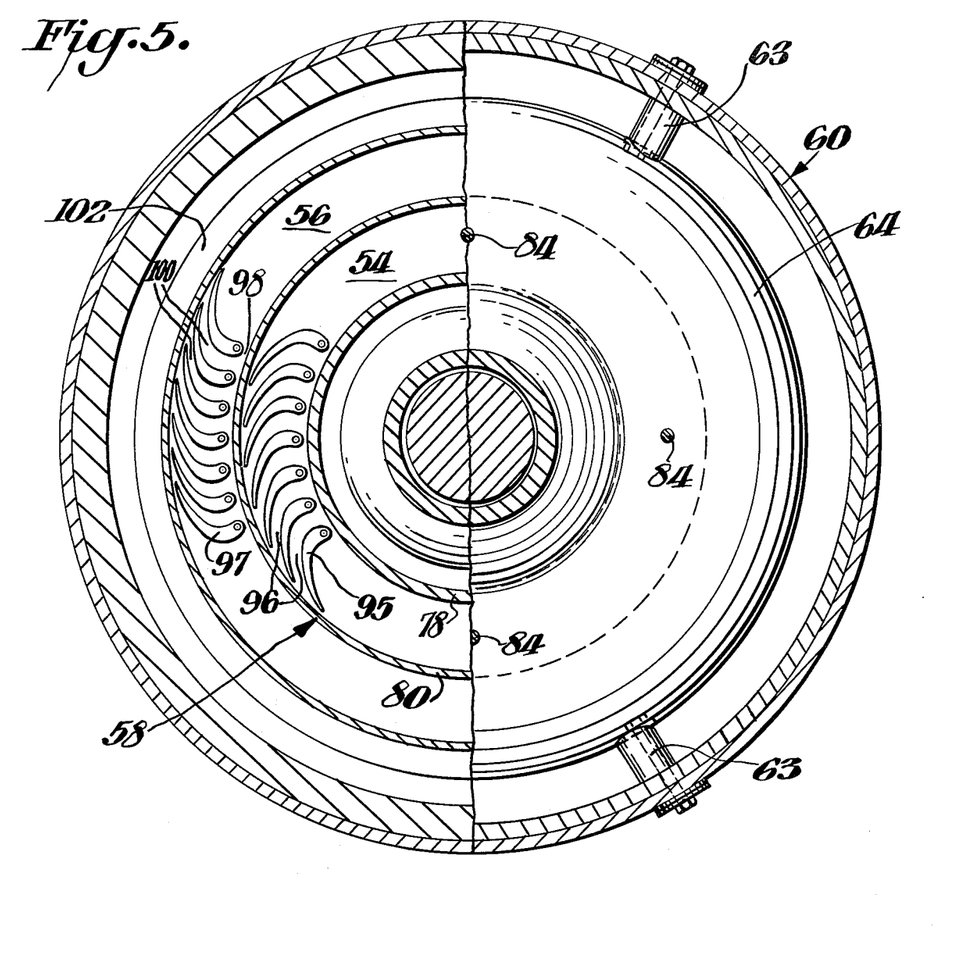
FIG. 5 is a cross sectional view taken through FIG. 3 along the line 5—5.

In FIGS. 3, 4 and 5 is shown variable hydraulic clutch 32, which is adapted from the energy absorbing device described in U.S. Pat. Re. 28,736 and is similar thereto except for the differences relative to a rotating outer rotor blade ring, its connection to an output shaft and related arrangement. Hydraulic clutch 32 includes the following components and assemblies.

1. Input shaft 30 with impeller blade or input rotor blade ring 54, which converts the mechanical energy from the driver to fluid momentum.

2. A turbine or output rotor blade ring 56 mounted on the output shaft 36 converts the fluid momentum to mechanical energy or torque at the output shaft 36.

3. A torque control shroud 58 which covers or uncovers the entrance and exit of the impeller blade ring 54. Mechanical variation of this flow restrictor shroud 58 results in output torques ranging from zero to full design in infinitely small degrees.

4. A fluid housing or stationary case 60 contains the coupling fluid about the input shaft, impeller blade ring 54, output shaft, turbine blade ring 56, and the torque control shroud 58 in annular recess 62 in flow control ring or toroid 64 provides a controlled flow path of return or recycling.

5. Stationary case 60 is mounted on a support 66 on the ground. Case 60 has three primary functions as follows:
 a. It provides support for the input and output shaft bearings 68 and 70.
 b. It supports the shroud control 72.
 c. It directs the fluid (i.e., water-ethylene glycol) flow within the hydraulic clutch 32.

6. Input shaft 30 connects directly to the flywheel-gearbox 24. This shaft has a blade ring disc 74 welded to it which supports the input blade rotor ring 54 shown in detail in FIG. 5. 7. Output shaft 36 is similar to the input shaft 30 except the output rotor blade ring 56 and corresponding support disc 76 are larger in diameter. Output shaft 40 connects directly to the tape drive Reel 44. The output blade ring 56 is shown in detail in FIG. 5.

8. Torque control shroud 58 consists of inner cylindrical section 78 and outer cylindrical section 80 with a flat annular cap 82. Shroud 58 is mounted in annular recess 62 in fluid flow control ring 64 which is in turn supported by three struts 63 attached within case 60.

9. Four actuating rods 84, are reciprocated and move piston and cylinder assemblies 86. Equalizing piston and cylinder 88 connected to shroud actuating cylinders 86 compensates for change in volume of actuating rods 84 as they are moved in and out of the space within casing 60. Four control rods 84 pass through case 60 and connect to the torque control shroud 58. A yoke follower sleeve 90 causes in and out movement of the torque control shroud 58. Follower sleeve 90 is positioned by the yoke 92 and yoke actuating handle 94. Scale 99 shows percent (%) shroud removal. The shroud position can be controlled by a remote prime mover connected to yoke 92 through cables or hydraulic lines (not shown). The prime mover could actuate the shroud by feedback from sensing the velocity or acceleration of the launch vehicle.

As the impeller or input blade ring 54 is driven by an input source of power, a fluid velocity relative to the blades 95 is developed at the impeller inlet which moves the fluid through the blade passages 96. The fluid exits the input rotor blade ring 54 with a lower relative velocity than the inlet velocity due to the losses occurring within the passages 96. To minimize blade losses, the entrance angle of the blade is directed toward the fluid flow. The gaging angles at the blade exit are important as the fluid is directed by these angles through the passage 98 between the impeller 54 and turbine 56 and towards the entrance angle of the turbine blades 97.

Similarly, the water flow from the periphery of the impeller 54 moves the water through the driven element blade passages 100 imparting energy to the driven element 56. At exit, the fluid velocity relative to the blades 97 is reduced by the losses occurring within the blade passages 100.

The driven blade 97 entrance and exit angles are similar to the impeller 54 blade angles in that they are designed to accept the fluid flow direction relative to the blade and allow the flow to leave the passages 100 without constriction.

Due to the impeller speed (N) and the blade entrance and exit radii to the impeller shaft ($r_1$ and $r_2$ respectively) a centrifugal energy head is developed by the impeller. That is:

$$\text{centrifugal energy head} = \frac{(R_2 N)^2 - (R_1 N)^2}{64.4}$$

Due to the driven element speed and blade entrance and exit radii to the impeller shaft, a second centrifugal energy head is developed at the driven element. The sum of the two centrifugal heads is used to circulate the flow to the inlet of the impeller through the return passage 102, which exists between the coupling case and the impeller and driven elements.

As a result of the centrifugal heads, the case pressure increases from the inlet of the impeller to a maximum at the periphery of the driven element 56.

Considering the return passage 102 of the fluid within the case as a pipe with fluid flow, a high relative pressure at the periphery of the turbine 56 relative to the inlet pressure at the impeller causes the fluid to circulate through the return passage 102 with an increasing velocity. Only losses due to friction against the walls of the case, for instance, will oppose the increasing velocity.

In summary, at the blade inlet to the impeller 54, the fluid velocity level is maximum, while the corresponding case pressure is minimum. At the periphery of the turbine driven element 56, the fluid velocity is minimum, while the corresponding case pressure is maximum. The fluid upon leaving the periphery of the driven element is circulated back to the impeller inlet with increasing velocity through the return passage 102 within the case. The circulation of fluid continues as long as the turbine 56 rotates slower than the impeller 54. This variance in rotation is defined as slip. At zero slip, the centrifugal head of the impeller and turbine elements are balanced against the centrifugal head of the return passage and, therefore, fluid does not flow.

Slip (S) is related to efficiency (n) by the equation, $$S = 1 - n$$

The efficiency is the ratio of power output to power input. Since power equals the product of the torque times the angular speed, and because the driven and impeller torques are equal, the efficiency is related to the ratio of the secondary speed ($N_o$) to primary speed ($N_i$).

Therefore, $$S = 1 - (N_o/N_i)$$

An efficient variable torque hydraulic clutch can be predicted analytically by satisfying the equations of energy (Bernoulli's equation), continuity, and angular momentum. The momentum relationship is defined by the basic angular momentum equation for a rotor which is:

$$T = (G/g)(V_{t2} R_2 - V_{t1} R_1)$$

Where:
$G$ = Mass flow of water
$g$ = Gravity constant
$V_{t2}$ = Tangential velocity of water at periphery of the element
$V_{t1}$ = Tangential velocity of water at entrance to the element
$R_2$ = Radius at periphery
$R_1$ = Radius at entrance
$T$ = Torque In addition, the losses in the clutch must be matched against the difference between the input and output power and the blades must be hydrodynamically efficient.

The primary loss in the clutch is the frictional drag of the fluid on the walls of the passages between the blades and the return passage located between the case and the driven element. These are predictable from the energy equation and are similar to pipe-friction losses and are expressed in the form of $fQ^2/2A^2$, where A is the cross sectional area of the flow (Q) at an arbitrary point in the circuit. The ratio Q/A is a measure of the water velocity relative to the passage walls. The value $f$ is the friction drag coefficient.

Minimizing the passage losses can be accomplished by directing the inlet nose of the blades towards the flow from the upstream passage. With the proper selection of blade angles (inlet and exit) to match an efficient airfoil, the losses can be reduced and a minimum slip condition can be obtained. The inlet edge of the blades are rounded to allow for the variation of inlet flow angle that occurs during the decreasing slip condition that occurs during the launch cycle. Of particular importance are the well-rounded leading edges which help to minimize entry "separation losses", which are caused by an abrupt change in the tangential velocity component as the water enters the impeller or driven element, owing to the difference in impeller and driven speeds. Separation losses are eddies set up because the main flow tends to separate from the leading edges of the blade, which is eventually dissipated by viscosity. Careful analysis can serve to eliminate or reduce the need for a high series of tests to optimize the blading design. The analysis will be compared to the test results and will be used to establish pertinent changes to obtain a high efficiency clutch.

The inner ring 78 of the shroud 58 is streamlined to reduce turbulence (losses) as the blades are covered and uncovered. This effectively forms part of the fluid flow control ring when the input blade ring is completely uncovered.

To account for shroud control rod displacement as the shroud is moved in and out, a hydraulic compensator system 88 is utilized. Fluid trapped by the four pistons and cylinders 86 on the shroud control rods 84 is directed by four hoses 85 to a single free piston and cylinder 88. As the rods 84 are drawn out, the piston and cylinder 88 moves in resulting in the case fluid volume being compensated automatically.

Figure 6:
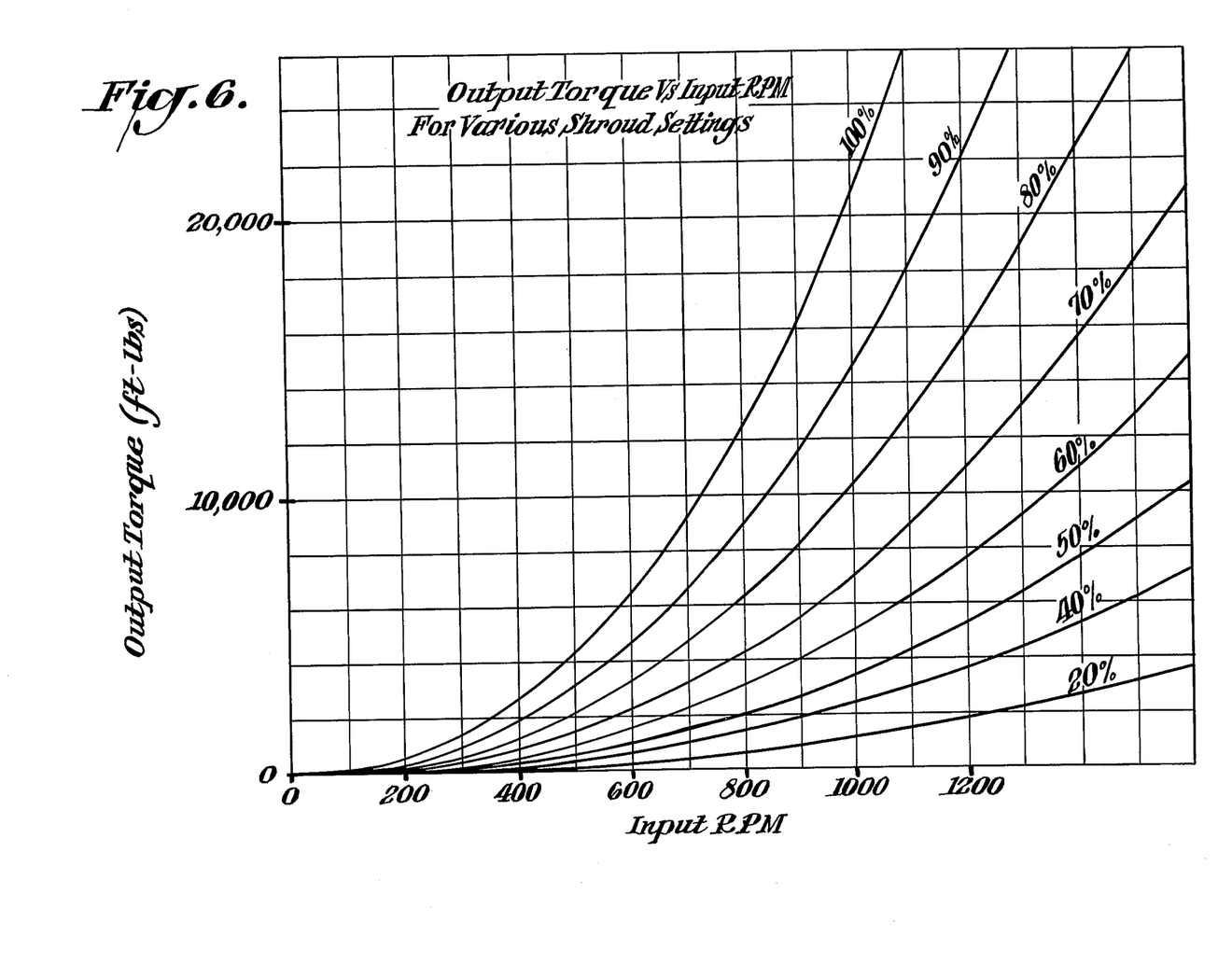
FIG. 6 is a graphical representation of the output torque vs. input speed for various shroud settings for the clutch shown in FIGS. 1-5.

FIG. 6 shows the results of a prototype clutch which was 33 inches in diameter and 14 inches in depth. The prototype was originally designed as an arresting gear and was not optimized for minimum slip. It was used because it was on hand and had the same general function and control characteristics of the clutch shown herein. FIG. 6 illustrates the torque vs. rpm performance of the apparatus at various shroud positions. The maximum steady state torque transmitted was 14,080 ft.-lbs. at 857 input rpm and maximum peak torque was 17,500 ft.-lbs. at 1000 rpm. Average slip during the steady state condition was nominally 34 percent. The test results show that the performance of the clutch is predictable, repeatable, and the torque output is controllable over the full torque/rpm range.

Torque developed by a clutch of this type can be expressed by the following relationship:

$$T = K \rho N^2 D^5$$

where
K = A Constant
$\rho$ = Fluid Density
N = Blade RPM
D = Blade Diameter

If blade diameter is doubled, the resultant torque is 32 times the result of the tested clutch. Neglecting other frictional losses a maximum torque of 17,500 × 32 = 560,000 ft.-lbs. can be attained at 34 percent.

The blade shape illustrated in FIG. 5 is designed to reduce the slip ratio of 10 percent with a resultant torque increase and heat generation decrease. Variations of shroud control are also contemplated which uses a ring cam to move the torque control rods in and out. The exchange of fluid in case 60 maintains an even temperature during repetitive aircraft launches. A heat analysis is based conservatively on a full sized clutch developing 612,500 ft.-lbs. of torque at 30 percent slip, shows a fluid temperature rise of 80° F in the case containing 3,575 pounds of water. Based on 90-second launch cycles the pump requirements for full fluid exchange between launches is 571 gpm. A heat exchanger rated at 11.5 × 10⁶ BTU/hour is also required.

A direct current motor or other prime mover of relatively low power can be used to accelerate the flywheel to its full energy condition with the shroud enveloping the rotor blades. Upon initiation of launch, the shroud is withdrawn from its position enveloping the rotor and exposes some or all of the rotor blades thus generating torque to the tape reel through the turbine blades attached to the output shaft. The purchase tape is thus reeled onto the empty reel and provides tow force to a dolly affixed to the end of the tape opposite to that end attached to the reel. Upon reaching either a predetermined distance in launch stroke or a velocity, the shroud is again extended to shroud the rotor blades and thus ceases to provide tow force to the purchase tape.

A launcher system would utilize a separate form of energy absorption to decelerate and stop the dolly, purchase element and drive tape.

Retract and rearm is accomplished by towing the dolly and the connected purchase element back to battery thereby unreeling tape from the drive reel with the shroud still in the rotor enveloping position.

The direct current motor (not shown) has already begun rebuilding the energy in the flywheel as soon as its control has sensed a drop in rotational velocity.

Advantages

1. Relatively inexpensive by virtue of the simplification of reduction gear boxes and large input and/or output mechanical clutches.
2. Highly reliable in that all components have been used in other applications with outstanding reliability.
3. Low maintenance in that no components are subject to mechanical wear or rubbing contact except rotary anti-friction bearings.
4. Very compact because of the minimizing of gear boxes and series type clutches common to other flywheel drive systems.
5. Relatively low in weight because of the simplication of reduction gear boxes.
6. Compact in size which combined with low weight makes it very adaptable to mobile or expeditionary use as may be desirable for tactical applications.

Other Applications are:

1. Manned or drone aircraft launcher.
2. Wheeled vehicle accelerator as in simulation of automotive vehicle crash testing.
3. By substituting a cable drum for the tape drum the system may be used as a dynamic loading device for testing energy absorbing winches.
4. Hydro-electrical installations whereby the clutch assembly would be installed between impeller output and generator input.

We claim:

1. A variable torque hydraulic radially comprising a casing having a toroidal cavity and an inner wall containing a liquid, a rotatable input shaft mounted upon the casing, an input rotor blade ring disposed within the casing and connected to the input shaft, a rotatable output shaft mounted on the casing, an output rotor blade ring disposed within the casing peripherally adjacent the input rotor blade ring and connected to the output shaft whereby the output rotor ring is caused to rotate in response to rotation of the input rotor ring, the input and output rotor blade rings each including an annular array of substantially rdially disposed rotor blades, a toroidal flow-control ring disposed in the casing which is separated from the inner wall by a surrounding space having short and long circumferences, the flow-control ring being disposed adjacent the sides of the rotor blade rings whereby liquid flowing through them is circulated within the casing in directions parallel to the shorter circumference of the space surrounding the flow-control ring and back through the rotor blade rings, an annular recess in the flow-control ring adjacent one of the rotor blade rings, an annular blocking plate means constructed and arranged to be capable of closing off the flow through one of the rotor blade rings, translating means connected to the annular blocking plate means for moving it from a position in the annular recess withdrawn from the liquid circulating through the rotor blade rings to a position disposed outside the annular recess which blocks the flow of liquid from circulating through one of the rotor blade rings whereby the force transmitted through the clutch is varied, and the annular blocking plate means comprises an annular channel having a pair of legs which are disposed on both sides of the blades on one of the annular rotor rings to block off flow through the blades.

2. A clutch as set forth in claim 1 wherein the annular channel is constructed and arranged to permit its pair of legs to cover both sides of the annular array of blades on the input rotor blade ring.

3. A clutch as set forth in claim 1 wherein the translating means comprises actuating rods connected to the annular blocking plate means, the actuating rods being disposed parallel to the input and output shafts, and an operating linkage connected to the actuating rods for moving them into and out of the casing.

4. A variable torque hydraulic clutch comprising a casing having a toroidal cavity and an inner wall containing a liquid, a rotatable input shaft mounted upon the casing, an input rotor blade ring disposed within the casing and connected to the input shaft, a rotatable output shaft mounted on the casing, an output rotor blade ring disposed within the casing peripherally adjacent the input rotor blade ring and connected to the output shaft whereby the output rotor ring is caused to rotate in response to rotation of the input rotor ring, the input and output rotor blade rings each including an annular array of substantially radially disposed rotor blades, a toroidal flow-control ring disposed in the casing which is separated from the inner wall by a surrounding space having short and long circumferences, the flow-control ring being disposed adjacent the sides of the rotor blade rings whereby liquid flowing through them is circulated within the casing in directions parallel to the shorter circumference of the space surrounding the flow-control ring and back through the rotor blade rings, an annular recess in the flow-control ring adjacent one of the rotor blade rings, an annular blocking plate means constructed and arranged to be capable of closing off the flow through one of the rotor blade rings, translating means connected to the annular blocking plate means for moving it from a position in the annular recess withdrawn from the liquid circulating through the rotor blade rings to a position disposed outside the annular recess which blocks the flow of liquid from circulating through one of the rotor blade rings whereby the force transmitted through the clutch is varied, the translating means comprises actuating rods connected to the annular blocking plate means, the actuating rods being disposed parallel to the input and output shafts, an operating linkage connected to the actuating rods for moving them into and out of the casing, the linkage comprises a sleeve mounted about the input shaft, the actuating rods being connected to the sleeve, a yoked lever, a pivot connecting the yoked lever to the casing, and a pair of followers connecting the yoked lever to the sleeve.

5. A variable torque hydraulic clutch comprising a casing having a toroidal cavity and an inner wall containing a liquid, a rotatable input shaft mounted upon the casing, an input rotor blade ring disposed within the casing and connected to the input shaft, a rotatable output shaft mounted on the casing, an output rotor blade ring disposed within the casing peripherally adjacent the input rotor blade ring and connected to the output shaft whereby the output rotor ring is caused to rotate in response to rotation of the input rotor ring, the input and output rotor blade rings each including an annular array of substantially radially disposed rotor blades, a toroidal flow-control ring disposed in the casing which is separated from the inner wall by a surrounding space having short and long circumferences, the flow-control ring being disposed adjacent the sides of the rotor blade rings whereby liquid flowing through them is circulated within the casing in directions parallel to the shorter circumference of the space surrounding the flow-control ring and back through the rotor blade rings, an annular recess in the flow-control ring adjacent one of the rotor blade rings, an annular blocking plate means constructed and arranged to be capable of closing off the flow through one of the rotor blade rings, translating means connected to the annular blocking plate means for moving it from a position in the annular recess withdrawn from the liquid circulating through the rotor blade rings to a position disposed outside the annular recess which blocks the flow of liquid from circulating through one of the rotor blade rings whereby the force transmitted through the clutch is varied, the translating means comprises actuating rods connected to the annular blocking plate means, the actuating rods being disposed parallel to the input and output shafts, an operating linkage connected to the actuating rods for moving them into and out of the casing, an equalizing piston and cylinder assembly is mounted on the casing, compensating piston and cylinder assemblies being mounted on the casing about each of the actuating rods, pistons mounted in the compensating cylinders which are connected to each of the actuating rods, conduits connecting each of the compensating cylinders to the equalizing cylinder for changing the volume in the equalizing cylinder disposed adjacent the casing to prevent the volume of liquid in the casing from being varied.

6. A variable torque hydraulic clutch comprising a casing having a toroidal cavity and an inner wall containing a liquid, a rotatable input shaft mounted upon the casing, an input rotor blade ring disposed within the casing and connected to the input shaft, a rotatable output shaft mounted on the casing, an output rotor blade ring disposed within the casing peripherally adjacent the input rotor blade ring and connected to the output shaft whereby the output rotor ring is caused to rotate in response to rotation of the input rotor ring, the input and output rotor blade rings each including an annular array of substantially radially disposed rotor blades, a toroidal flow-control ring disposed in the casing which is separated from the inner wall by a surrounding space having short and long circumferences, the flow-control ring being disposed adjacent the sides of the rotor blade rings whereby liquid flowing through them is circulated within the casing in directions parallel to the shorter circumference of the space surrounding the flow-control ring and back through the rotor blade rings, an annular recess in the flow-control ring adjacent one of the rotor blade rings, an annular blocking plate means constructed and arranged to be capable of closing off the flow through one of the rotor blade rings, translating means connected to the annular blocking plate means for moving it from a position in the annular recess withdrawn from the liquid circulating through the rotor blade rings to a position disposed outside the annular recess which blocks the flow of the liquid from circulating through one of the rotor blade rings whereby the force transmitted through the clutch is varied, and the annular blocking plate means includes inner and outer cylindrical sections which are streamlined.

7. A clutch as set forth in claim 1 wherein the flow-control ring is connected to the casing by streamlined struts.

8. A clutch as set forth in claim 1 wherein curved blades are disposed in the inner and outer rotor blade rings, and the direction of curvature of the blades on the inner and outer rotor blade rings being opposite to each other.

9. A clutch as set forth in claim 8 wherein passages are provided between the blades on the inner and outer rotor blade rings, and the passages being unrestricted in width from inlet to outlet of the rotor blade rings.

* * * * *